(12) United States Patent
Fan Jiang et al.

(10) Patent No.: US 7,781,857 B2
(45) Date of Patent: Aug. 24, 2010

(54) TRANSFLECTIVE LCD PANEL, TRANSMISSIVE LCD PANEL, AND REFLECTIVE LCD PANEL

(75) Inventors: Shih-Chyuan Fan Jiang, Hsinchu (TW); Ching-Huan Lin, Hsinchu (TW); Chih-Ming Chang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 12 days.

(21) Appl. No.: 12/408,946

(22) Filed: Mar. 23, 2009

(65) Prior Publication Data

US 2009/0180067 A1 Jul. 16, 2009

Related U.S. Application Data

(63) Continuation of application No. 11/693,764, filed on Mar. 30, 2007, now Pat. No. 7,525,169.

(30) Foreign Application Priority Data

Aug. 31, 2006 (TW) ............................... 95132180 A (51) Int. Cl.
*H01L 27/146* (2006.01)
(52) U.S. Cl. .................. 257/448; 257/294; 257/444; 257/E27.131
(58) Field of Classification Search ........... 257/444, 257/448, 294, E27.131
See application file for complete search history.

(56) References Cited

U.S. PATENT DOCUMENTS 7,379,135 B2* 5/2008 Lin et al. .............. 349/114
2004/0021816 A1 2/2004 Jeong et al.

* cited by examiner

*Primary Examiner*—Victor A Mandala
(74) *Attorney, Agent, or Firm*—Thomas, Kayden, Horstemeyer & Risley (57) ABSTRACT

The invention provides an LCD panel with main slits corresponding to alignment protrusions. The gate lines are shielded by the electrode portion and do not overlap the main slits. Because the gate line and the major slits do not overlap, the liquid crystal molecule arrangement of the liquid crystal layer is not affected by the operating voltage of the gate line.

25 Claims, 12 Drawing Sheets

TRANSFLECTIVE LCD PANEL, TRANSMISSIVE LCD PANEL, AND REFLECTIVE LCD PANEL

CROSS-REFERENCE TO RELATED APPLICATION

This application is a continuation of U.S. patent application Ser. No. 11/693,764, filed Mar. 30, 2007.

BACKGROUND OF THE INVENTION

1. Field of the Invention

The invention relates to liquid crystal display panels, and in particular to the structure of array substrates thereof.

2. Description of the Related Art

Transmissive Liquid crystal displays (LCD) require a backlight module with high power consumption with limited display capability under intense environmental light. Reflective LCDs utilize a reflective electrode portion displacing the transparent electrode portion, without backlight module, which cannot be used in dark surroundings. Transflective LCDs combine the advantages of both and avoiding disadvantages thereof. For increased viewing angle, such LCDs are often integrated with multi-domain vertical alignment (MVA) technology, such as patterned vertical alignment (PVA) or advanced super V (ASV). In addition to a wide viewing angle, MVA-LCDs offer high contrast ratio and response speed, and other benefits. In MVA-LCDs, a plurality of alignment protrusions is defined on the array substrate or the color filter substrate. The liquid crystal alignment is divided into two, four, or more types by the angle of the alignment protrusions, referred to as automatic domain formation (ADF). The pattern of the alignment protrusions can comprise ribbed, zigzag, or rhomboid, and the cross-section of the alignment protrusions can include triangle, semicircle, or square.

Figure 1:
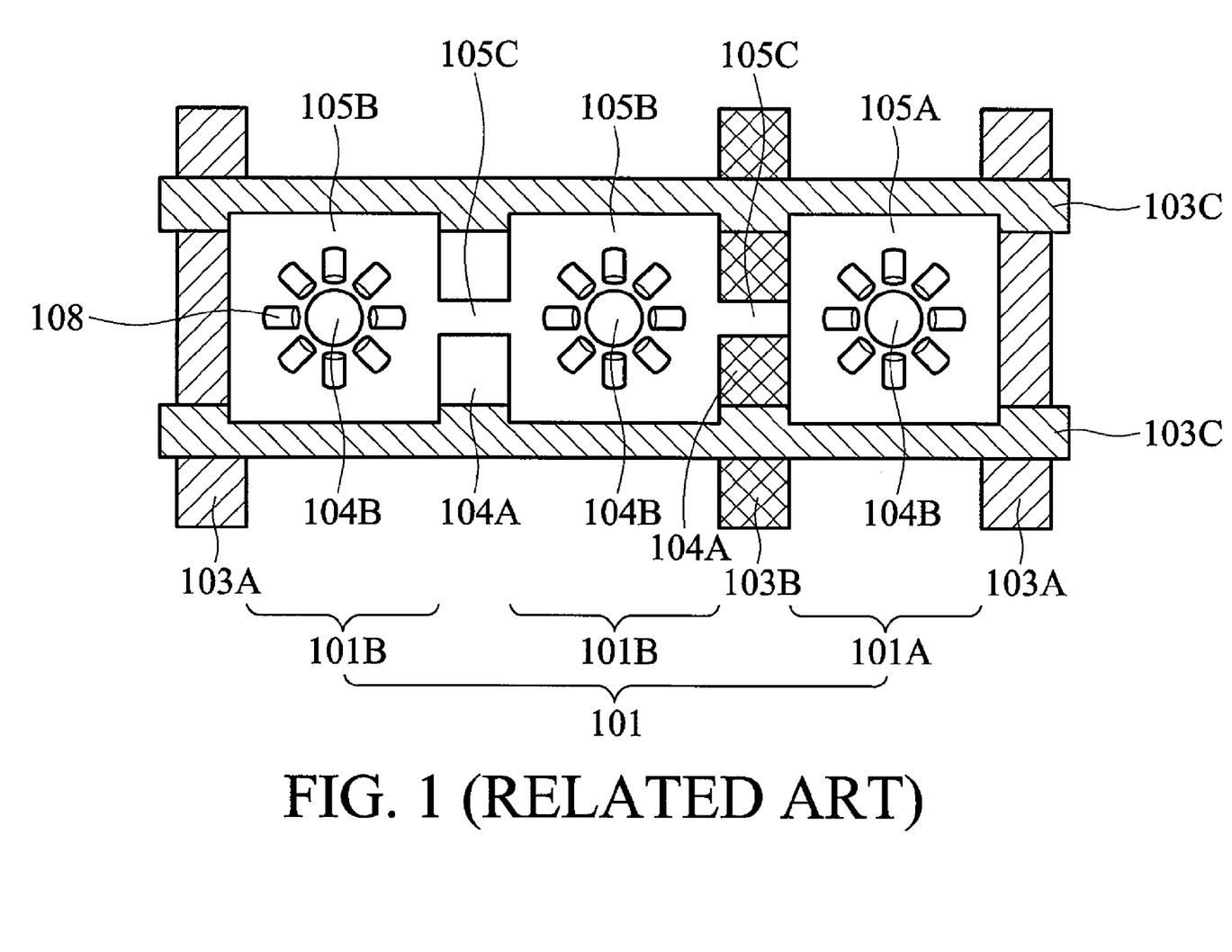
FIG. 1 is a top view of a subpixel of a conventional transflective LCD panel.

FIG. 1 is a top view of a subpixel of a conventional transflective LCD panel. The array substrate of the panel has common lines 103A and gate lines 103B parallel to each other, and data lines 103C perpendicular to the common lines 103A and gate lines 103B constituting subpixels 101, defined between two common lines 103A and two data lines 103C, and a gate line 103B disposed between two common lines 103A. The gate line 103B connects to a thin film transistor (not shown) to drive the subpixel 101. Referring to FIG. 1, subpixel 101 is divided into reflective region 101A and transmission region 101B, which comprise reflective electrode portion 105A and transparent electrode portion 105B, respectively. The color filter substrate, corresponding to the array substrate, has alignment protrusions 104B to control liquid crystal alignment. Major slits 104A are formed between the reflective region 101A and the transmission region 101B to improve alignment. In addition, connection electrodes 105C are formed to electrically connect the reflective electrode portion 105A and transparent electrode portion 105B separated by the major slits 104A.

Figure 2:
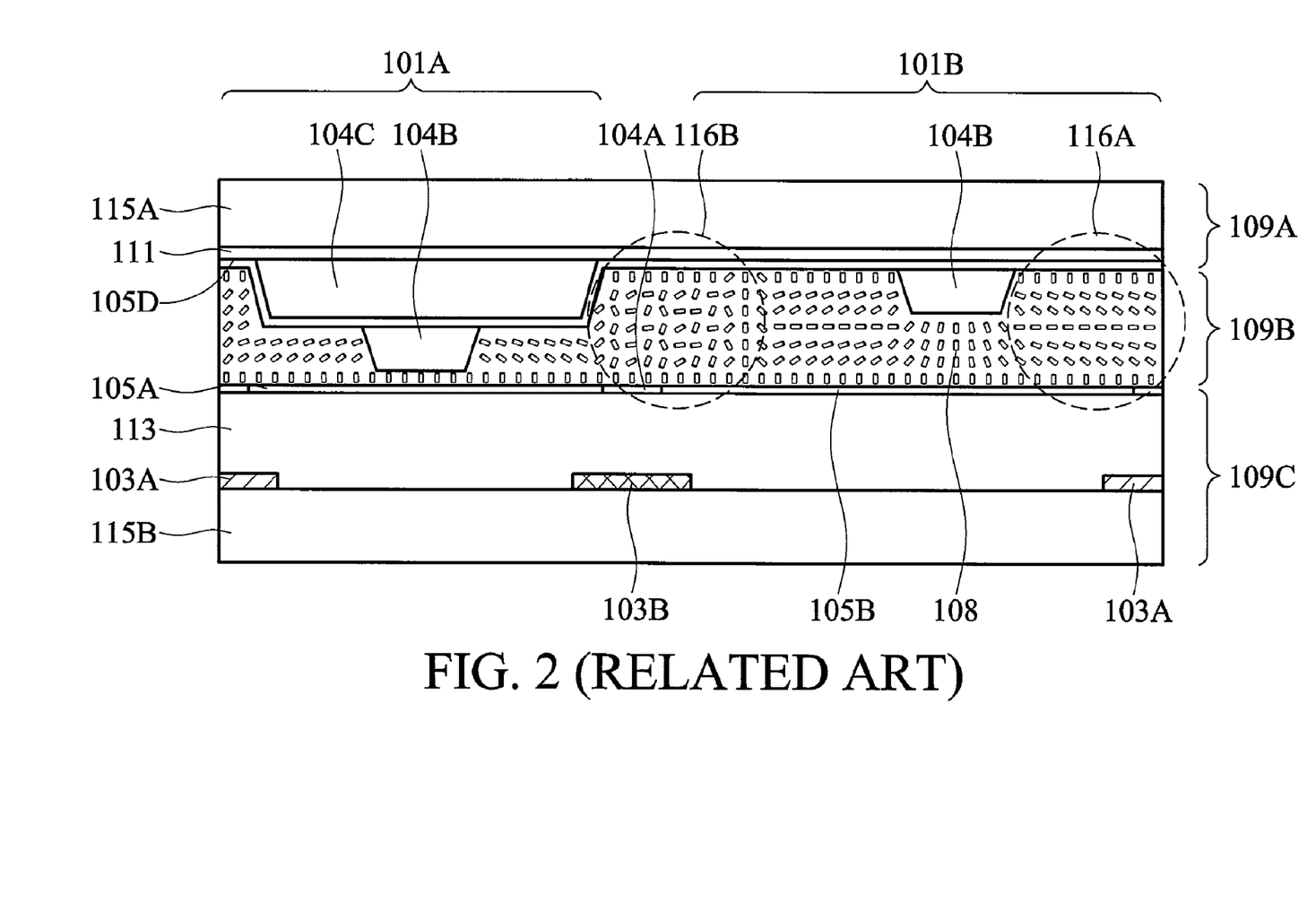
FIG. 2 shows a simulation of the liquid crystal molecules in bright status according to structure of FIG. 1.

As shown in FIG. 1, in an array substrate fabricated by conventional low temperature poly silicon process, the major slit 104A overlaps the gate line 103A. The tilt angles of the liquid crystal molecules are different due to voltage differences of gate lines 103B and the common lines 103A. FIG. 2 shows a simulation of the liquid crystal molecules in bright status according to structure of FIG. 1. As shown in FIG. 2, the LCD panel includes reflection region 101A and transmission region 101B. The liquid crystal layer 109B is disposed between the color filter substrate 109A and the array substrate 109C. The color filter substrate 109A includes transparent substrate 115A, color filter 111, alignment protrusions 104B, and transparent photoresist layer 104C. The crystal layer 109B of the reflection region 101A can be thinner than the transparent photoresist layer 104C. The array substrate 109B includes transparent substrate 115B, common lines 103A and gate lines 103B in stacked circuit layer 113, and the uppermost layer reflective electrode portion 105A and transparent electrode portion 105B. The major slit 104A, between the reflective electrode portion 105A and the transparent electrode portion 105B, overlaps the gate line 103B. The liquid crystal molecules 108 in dotted circle 116A adjacent to the common line 103A are regularly arranged. The liquid crystal molecules 108 in dotted circle 116B adjacent to the gate line 103B and the major slit 104A are irregularly arranged, thereby reducing the liquid crystal effect.

Accordingly, a method of dissolving low liquid crystal effect due to high operating voltage of gate lines is called for in which known processes such as low temperature poly silicon are preferably retained.

BRIEF SUMMARY OF THE INVENTION

Accordingly, the invention provides a transflective liquid crystal display panel, comprising an array substrate comprising a plurality of parallel gate lines, a plurality of common lines parallel to the gate lines, and a plurality of parallel data lines perpendicular to the gate lines, wherein the gate lines, the common lines, and the data lines define a plurality of subpixels; each comprising at least one transmission region, at least one reflection region, a TFT electrically connecting to the gate line, a transparent electrode portion in the transmission region electrically connecting to the TFT, a reflective electrode portion in the reflection region, at least one major slit between the transmission region and the reflection region, and at least one connection electrode electrically connecting the transparent electrode portion and the reflective electrode portion, wherein the major slits and the gate lines do not overlap; a color filter substrate, comprising a plurality of color filters corresponding to the subpixels of the array substrate, and a liquid crystal layer, disposed between the array substrate and the color filter substrate.

The invention also provides a transflective liquid crystal display panel, comprising an array substrate comprising a plurality of parallel gate lines, a plurality of common lines parallel to the gate lines, and a plurality of parallel data lines perpendicular to the gate lines, wherein the gate lines, the common lines, and the data lines define a plurality of subpixels, wherein each of the subpixels comprises at least one transmission region; at least one reflection region; a TFT electrically connecting to the gate line; a transparent electrode portion in the transmission region electrically connecting to the TFT; and a reflective electrode portion in the reflection region, at least one major slit between the transmission region and the reflection region, and at least one connection electrode electrically connecting the transparent electrode portion and the reflective electrode portion; wherein the gate lines are shielded by the transparent electrode portion, a color filter substrate, comprising a plurality of color filters corresponding to the subpixels of the array substrate, and a liquid crystal layer, disposed between the array substrate and the color filter substrate.

The invention further provides a transmissive liquid crystal display panel, comprising an array substrate comprising a plurality of parallel gate lines, a plurality of common lines parallel to the gate lines, and a plurality of parallel data lines perpendicular to the gate lines, wherein the gate lines, the common lines, and the data lines define a plurality of subpixels, wherein each of the subpixels comprises at least one transmission region, at least one reflection region, a TFT electrically connecting to the gate line, a transparent electrode portion in the transmission region electrically connecting to the TFT, a reflective electrode portion in the reflection region, at least one major slit between the transmission region and the reflection region, and at least one connection electrode, electrically connecting the transparent electrode portion and the reflective electrode portion; wherein the gate lines are shielded by the transparent electrode portion, a color filter substrate, comprising a plurality of color filters corresponding to the subpixels of the array substrate, and a liquid crystal layer, disposed between the array substrate and the color filter substrate.

The invention further provides a reflective liquid crystal display panel, comprising an array substrate comprising a plurality of parallel gate lines, a plurality of common lines parallel to the gate lines, and a plurality of parallel data lines perpendicular to the gate lines, wherein the gate lines, the common lines, and the data lines define a plurality of subpixels, wherein each of the subpixels comprises at least one transmission region, at least one reflection region, a TFT electrically connecting to the gate line, a transparent electrode portion in the transmission region electrically connecting to the TFT, a reflective electrode portion in the reflection region, at least one major slit between the transmission region and the reflection region, and at least one connection electrode electrically connecting the transparent electrode portion and the reflective electrode portion; wherein the gate lines and the major slit do not overlap; a color filter substrate, comprising a plurality of color filters corresponding to the subpixels of the array substrate; and a liquid crystal layer, disposed between the array substrate and the color filter substrate.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiment 1

The Array Substrate of the Transflective LCD Panel

Figure 3A:
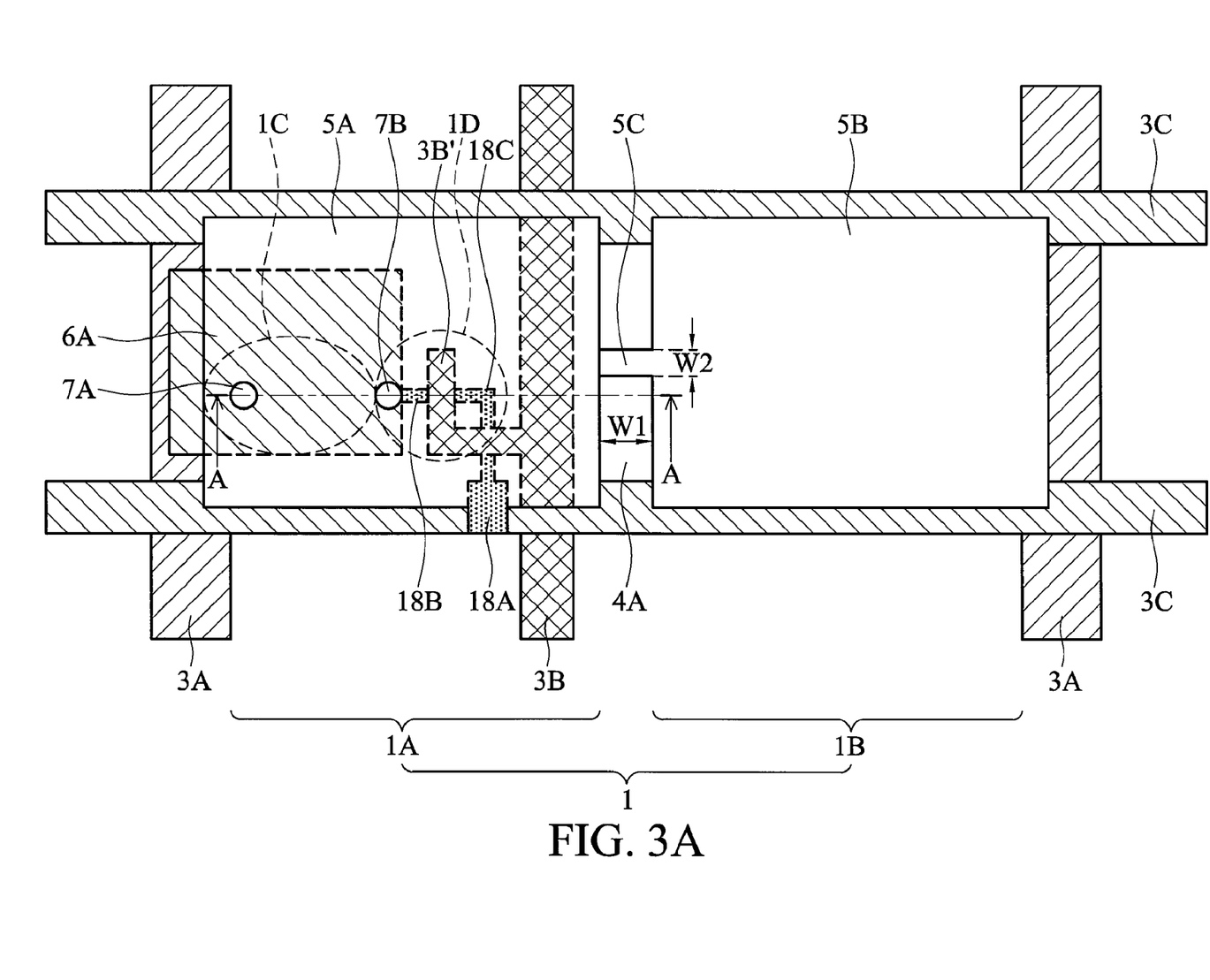
FIG. 3A is a top view of a subpixel in an embodiment of the invention.

FIG. 3A is a top view of a subpixel in Embodiment 1. Subpixel 1 is defined by two common lines 3A crossing data lines 3C, and a gate line 3B disposed between two common lines 3A. The common lines 3A, the data lines 3C, and the gate line 3B may be conductive metal or alloy, such as Ti, Al, or combination thereof. Note that subpixel 1 can be defined by two gate lines 3B crossing two data lines 3C, and the common line 3A is disposed between two gate lines 3B. The definition of the subpixel 1 is determined by the subpixels of corresponding color filter substrate (not shown). The subpixel 1 is divided to reflection region 1A and transmission region 1B with major slit 4A therebetween. The reflection region 1A includes reflective electrode portion 5A, and the transmission region 1B includes transparent electrode portion 5B, respectively. Separated reflective electrode portion 5A and transparent electrode portion 5B are electrically connected by at least one connection electrode 5C. The reflective electrode portion 5A includes Al. The transparent electrode portion 5B includes indium tin oxide (ITO), indium zinc oxide (IZO), cadmium tin oxide (CTO), stannum dioxide (SnO2), or zinc oxide (ZnO). While only one connection electrode 5C is shown in FIG. 3A, more than two are equally applicable. The material of the connection electrode 5C can be similar to that of reflective electrode portion 5A or transparent electrode portion 5B.

In storage capacitor 1C of the subpixel 1, the middle electrode portion (not shown) is connected to the common lines 3A, and the top electrode portion 6A can be formed with data lines 3C simultaneously. The gate line 3B extends to gate electrode 3B' of the TFT 1D in the reflection region 1A. The data lines 3C connect to a semiconductor layer 18A. The semiconductor layer 18A extends to serve as channel layer (not shown), source/drain 18C/18B, and bottom electrode portion (not shown) of the storage capacitor 1C. The channel layer, the source/drain, and the bottom electrode portion can be low temperature polysilicon, single crystal silicon, or amorphous silicon. The semiconductor layer 18A and its extension can be formed simultaneously. The channel layer is masked by gate electrode 3B', and the source/drain 18C/18B and the bottom electrode portion process light doped drain (LDD).

Figure 3B:
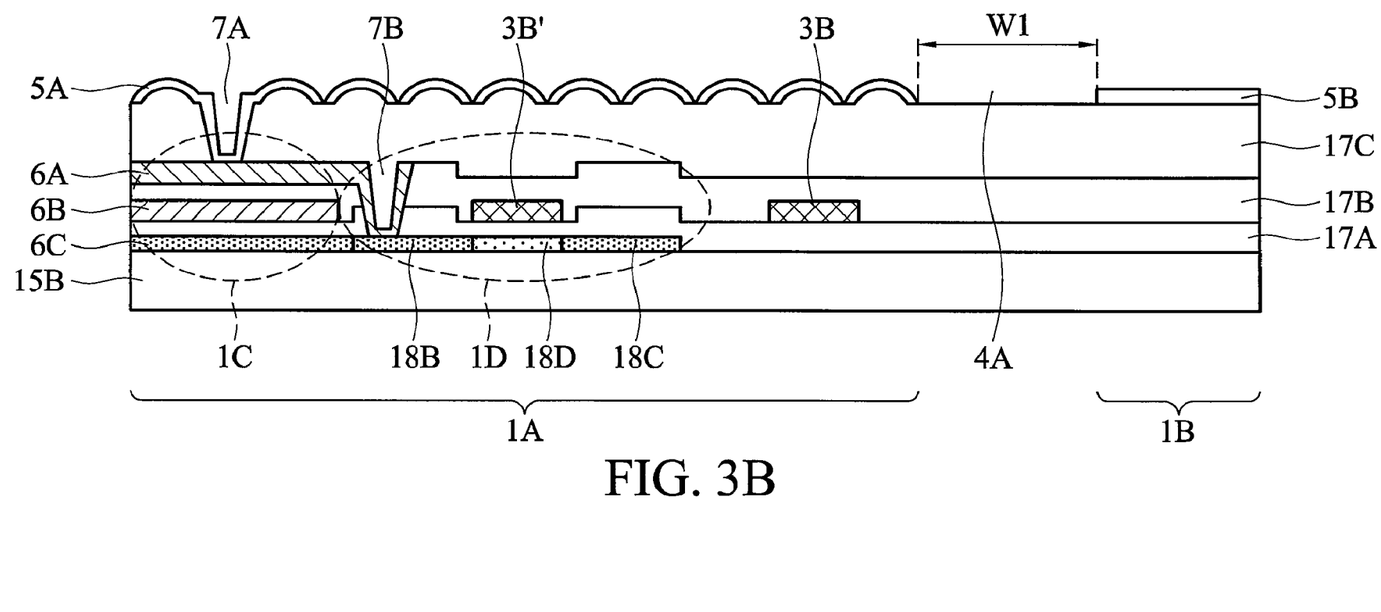
FIG. 3B is a sectional view of hatching line A-A in FIG. 3A.

FIG. 3B is a cross section of hatching line A-A in FIG. 3A. On the transparent substrate 15B, source/drain 18C/18B and bottom electrode portion 6C, transparent insulating layer 17A, gate line 3B, gate electrode 3B', and middle electrode portion 6B, transparent insulating layer 17B, top electrode portion 6A, organic material layer 17C, and uppermost layer such as reflective electrode portion 5A and transparent electrode portion 5B are sequentially formed. The transparent substrate 15B is preferably glass, plastic, or other. The transparent insulating layer 17A and 17B can be the same or different, of silicon dioxide ($SiO_2$) or silicon nitride ($SiN_x$). The organic material layer 17C may be acrylic resin. As shown in FIG. 3B, the reflective electrode portion 5A has a contact hole 7A, through the organic material layer 17C, electrically connecting to the top electrode portion 6A. The top electrode portion 6A has another contact hole 7B electrically connecting to the source 18B. Storage capacitor 1C comprises a transparent insulating layer 17A formed between the top electrode portion 6A and the middle electrode portion 6B, and a transparent insulating layer 17B formed between the middle electrode portion 6B and the bottom electrode portion 6C, respectively. In addition to that described, those skilled in the field may optionally adopt other types of TFT and corresponding fabrications as necessary.

As shown in FIGS. 3A and 3B, the major slit 4A has a width W1 of about 1 μm to about 15 μm, and preferably of about 7 μm to about 10 μm. The connection electrode 5C has a width W2 of about 1 μm to about 15 μm, and preferably of about 5 μm to about 6 μm. The area of the reflection region 1A is 0.4 to 3 times that of the transmission region 1B. In a preferred embodiment, the area of the transmission region 1B is larger than the reflection region 1A, and more than one major slit 4A is needed to divide a large transmission region 1B into several small transmission regions 1B. In other embodiments, subpixel 1 includes a reflection region 1A and two transmission regions 1B, these regions separated by the major slits 4A and electrically connected by the connection electrode 5C.

Referring to FIGS. 3A and 3B, the gate line 3B does not overlap the connection electrode 5C or the major slit 4A. The irregular arrangement of the crystal liquid molecules due to high voltage of the gate line is improved.

Embodiment 2

Transflective LCD Panel

Figure 4A:
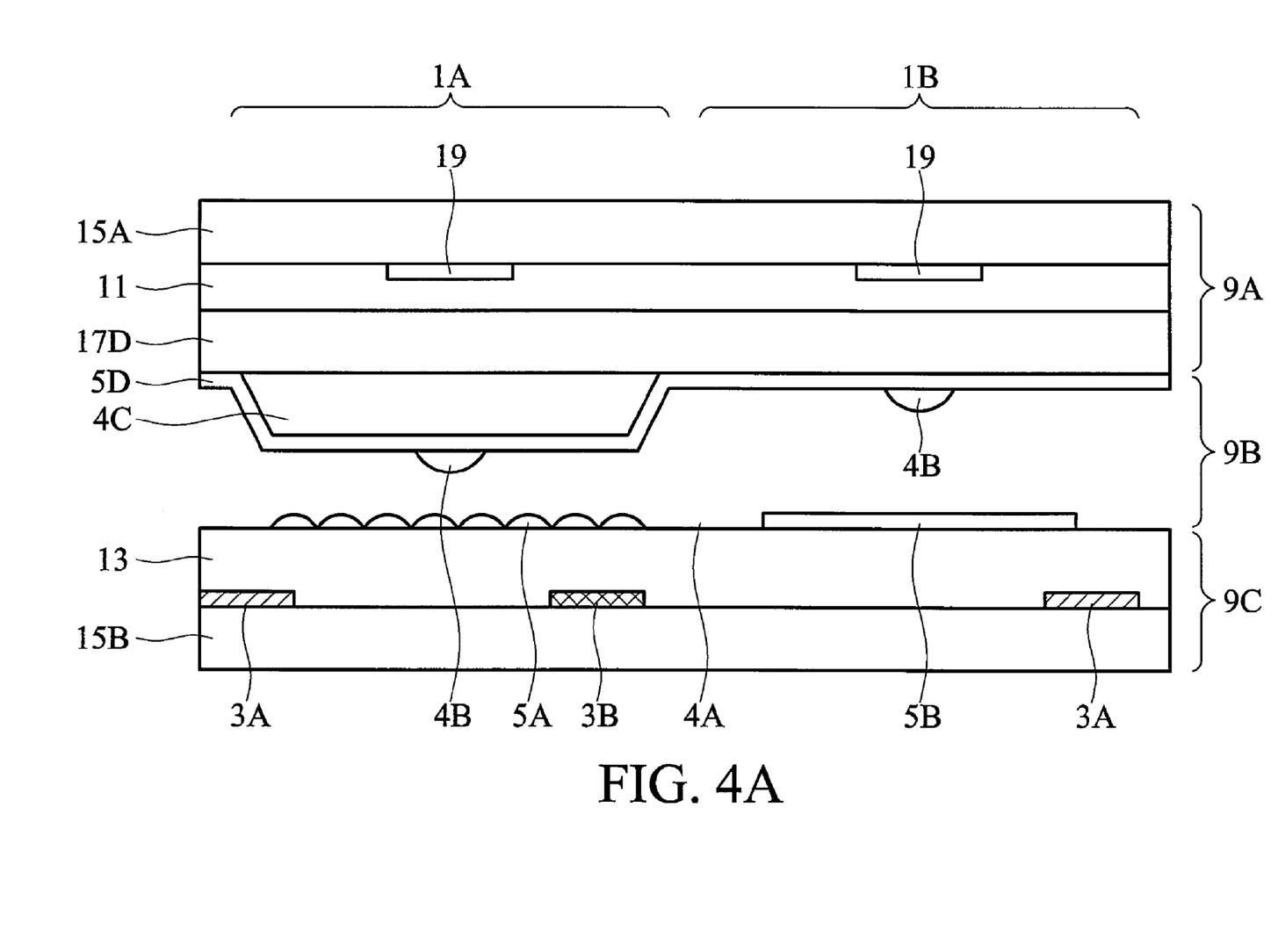
FIGS. 4A-4D are sectional views of LCD panels in embodiments of the invention.

FIG. 4A is a sectional view of transflective LCD panels in the preferred embodiment of the invention. The description of TFT is omitted for simplicity. Referring to FIG. 4A, the LCD panel includes a liquid crystal layer 9B disposed between the array substrate 9C and the color filter substrate 9A, divided into two reflection regions 1A and a transmission region 1B. The color filter substrate 9A includes transparent substrate 15A, color filter 11 with black matrix 19 therebetween, overcoat 17D, conductive layer 5D, and alignment protrusions 4B. The transparent substrate 15A can be glass or plastic. The color filter can be dyed resin of RGB or other colors. The conductive layer 5D is transparent metal oxide, such as ITO, IZO, CTO, $SnO_2$, or ZnO. Although alignment protrusions 4B are formed on the color filter substrate 9A in this embodiment, it is possible to form alignment protrusions 4B on the array substrate 9C. The alignment protrusions 4B can be photoresist material, with shape thereof not limited to semicircular but also pyramidal, square, or other suitable shape. The dual gap is adopted to equalize the light path distances of the reflection region 1A and the transmission region 1B. The dual gap comprises a transparent photoresist layer 4C on the color filter substrate 9A of the reflection region 1A, such that the thickness of the liquid crystal layer 9B is different in the reflection region 1A and the transmission region 1B, wherein the thickness of the former is preferably half of the latter. In other embodiments, the transparent photoresist layer 4C can be formed on the array substrate 9C of the reflection region 1A, or no transparent photoresist layer may be present, and the thickness of the liquid crystal layer 9B may be same in the reflection region 1A and the transmission region 1B, a single gap design.

In FIG. 4A, the array substrate 9C includes transparent substrate 15B, common lines 3A and gate line 3B in stacked circuit layer 13, and uppermost layer such as reflective electrode portion 5A, transparent electrode portion 5B, major slit 4A therebetween, and connection electrode (not shown). The reflective electrode portion 5A corresponds to the reflection region 1A, and the transparent electrode portion 5B corresponds to the transmission region 1B, respectively. Because the gate lines 3B does not overlap the major slit 4A or the connection electrode 5C, the liquid crystal molecule arrangement of the liquid crystal layer 9B is not affected by the operating voltage of the gate line 3B.

Embodiment 3

Transflective LCD Panel

Figure 4B:
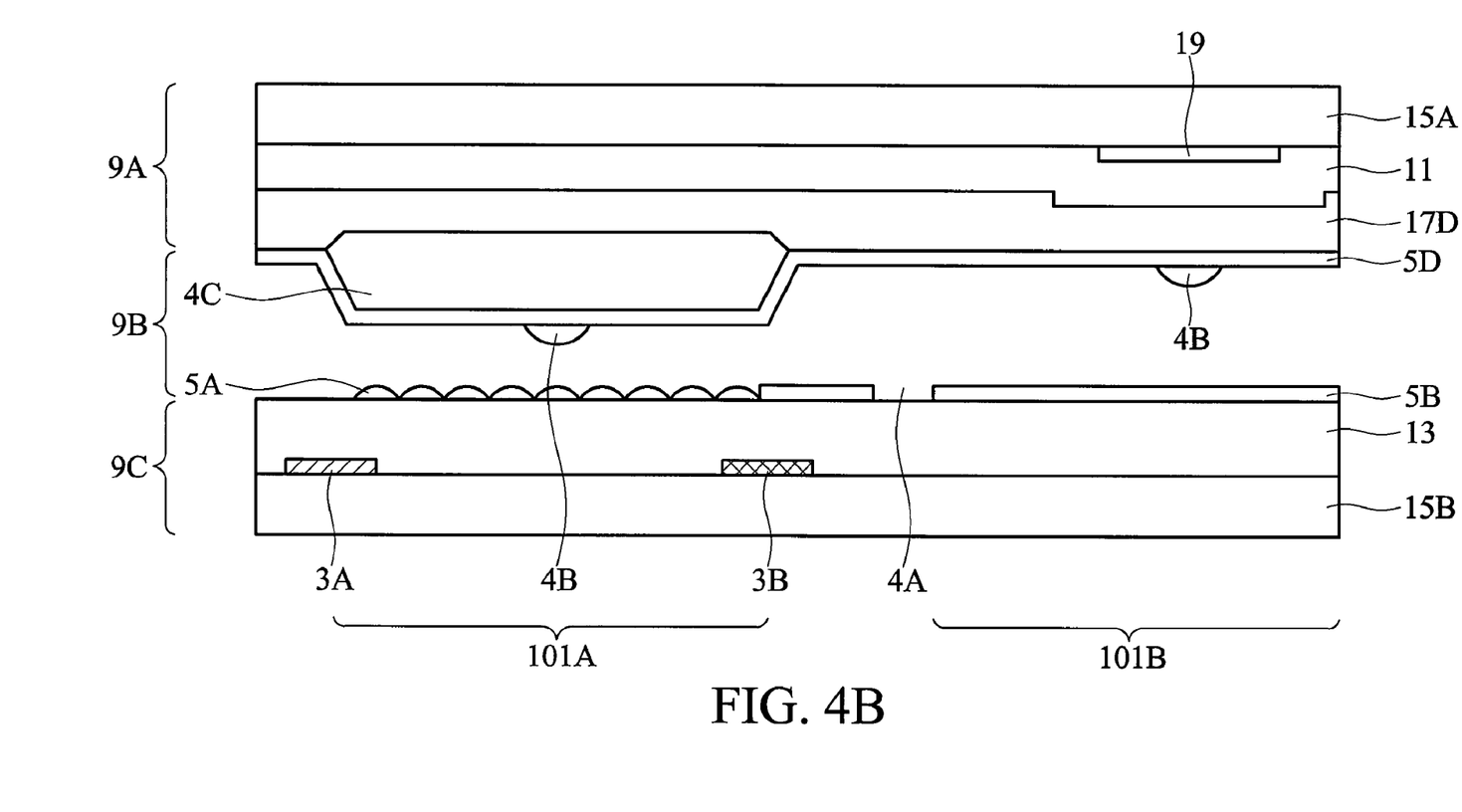

FIG. 4B is a sectional view of transflective LCD panels in another preferred embodiment of the invention. Unlike FIG. 4A, here part of the transparent electrode portion 5B extends to the reflection region 1A to shield the gate line 3B. The transparent electrode portions 5B are separated by major slit 4A and connected by at least one connection electrode (not shown). Part of the gate line 3B is shielded by the reflective electrode portion 5A and another part by the transparent electrode portion 5B, or all of gate line 3B is shielded by the transparent electrode portion 5B. Because the gate line 3B is shielded by the transparent electrode portion 5B, the liquid crystal molecule arrangement of the liquid crystal layer 9B is not affected by the operating voltage of the gate line 3B.

The disclosed embodiments, such as gate line 3B and major slit 4A not overlapping or gate line 3B being shielded by the transparent electrode portion 5B, while applied in the transflective LCD. Otherwise, the invention can be applied in transmission or reflective LCD as below.

Embodiment 4

Transmissive LCD Panel

Figure 4C:
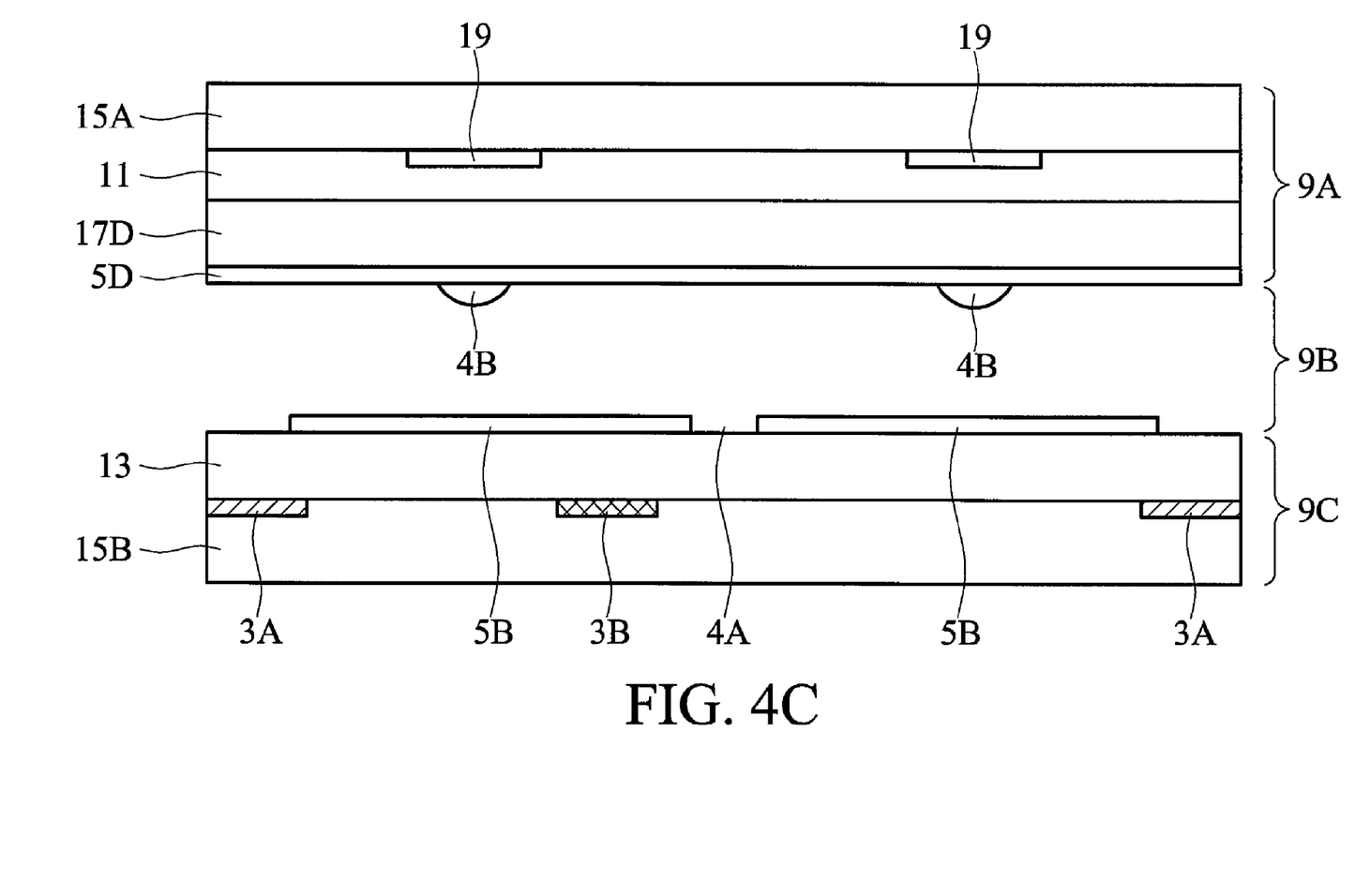

Unlike FIG. 4A, in FIG. 4C, all display regions are transmissive type. All electrode portions on the array substrate 9C are transparent electrode portion 5B. In addition to the alignment protrusions 4B on the color filter substrate, at least one major slit is necessary to separate the transparent electrode portion 5B for multiple domain alignment of the liquid crystal molecules. Because the gate line 3B is shielded by the transparent electrode portion 5B, the liquid crystal molecule arrangement of the liquid crystal layer 9B is not affected by the operating voltage of the gate line 3B.

Embodiment 5

Reflective LCD Panel

Figure 4D:
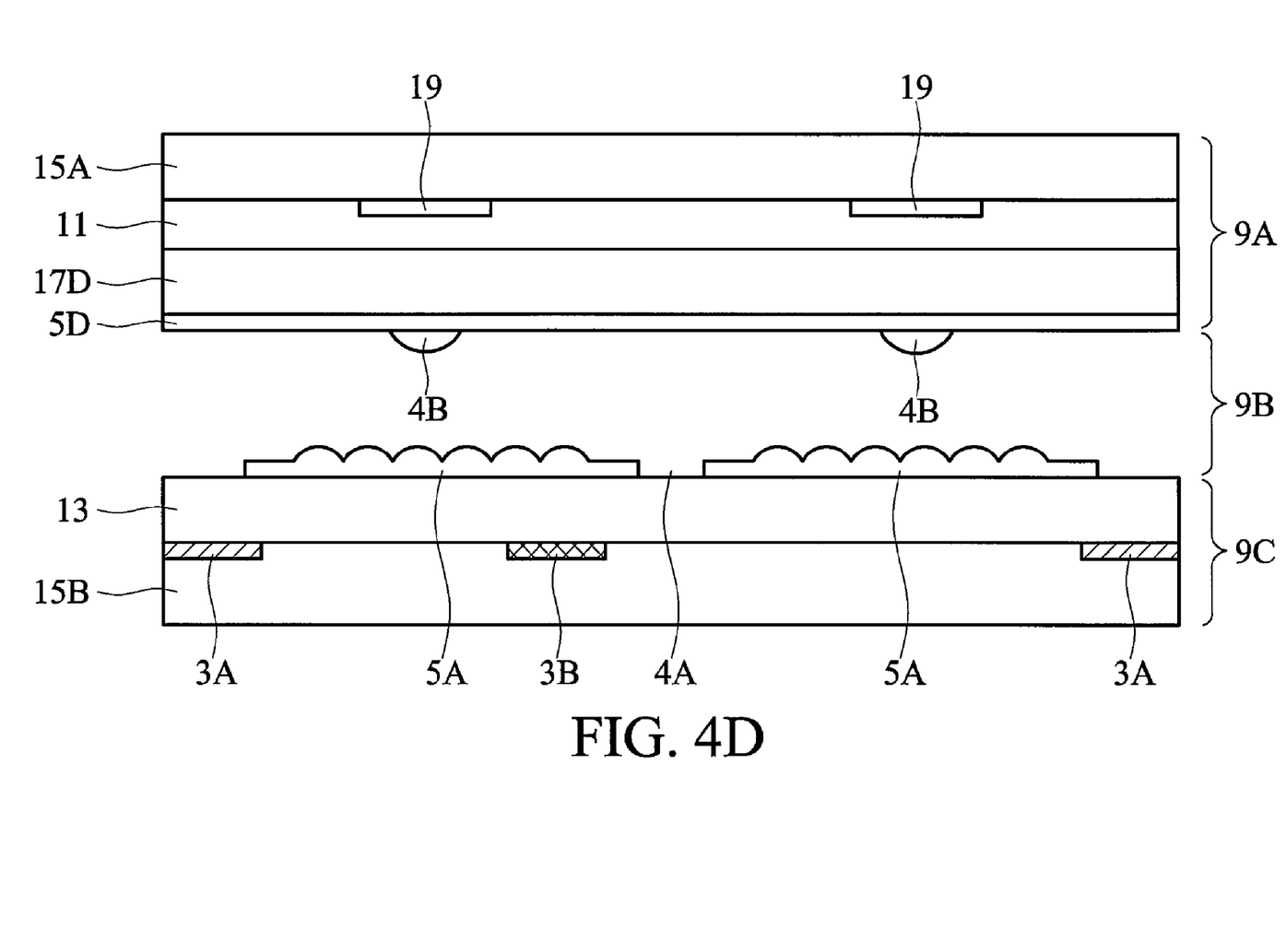

Unlike FIG. 4C, in FIG. 4D, all display regions are reflective type. Similar to FIG. 4C, this configuration needs at least one major slit 4A for liquid crystal molecule multi domain alignment. Because the gate line 3B does not over the major slits 4A or the connection electrode 5C, the liquid crystal molecule arrangement of the liquid crystal layer 9B is not affected by the operating voltage of the gate line 3B.

Embodiment 6

The Array Substrate of the Transflective LCD Panel

Figure 5A:
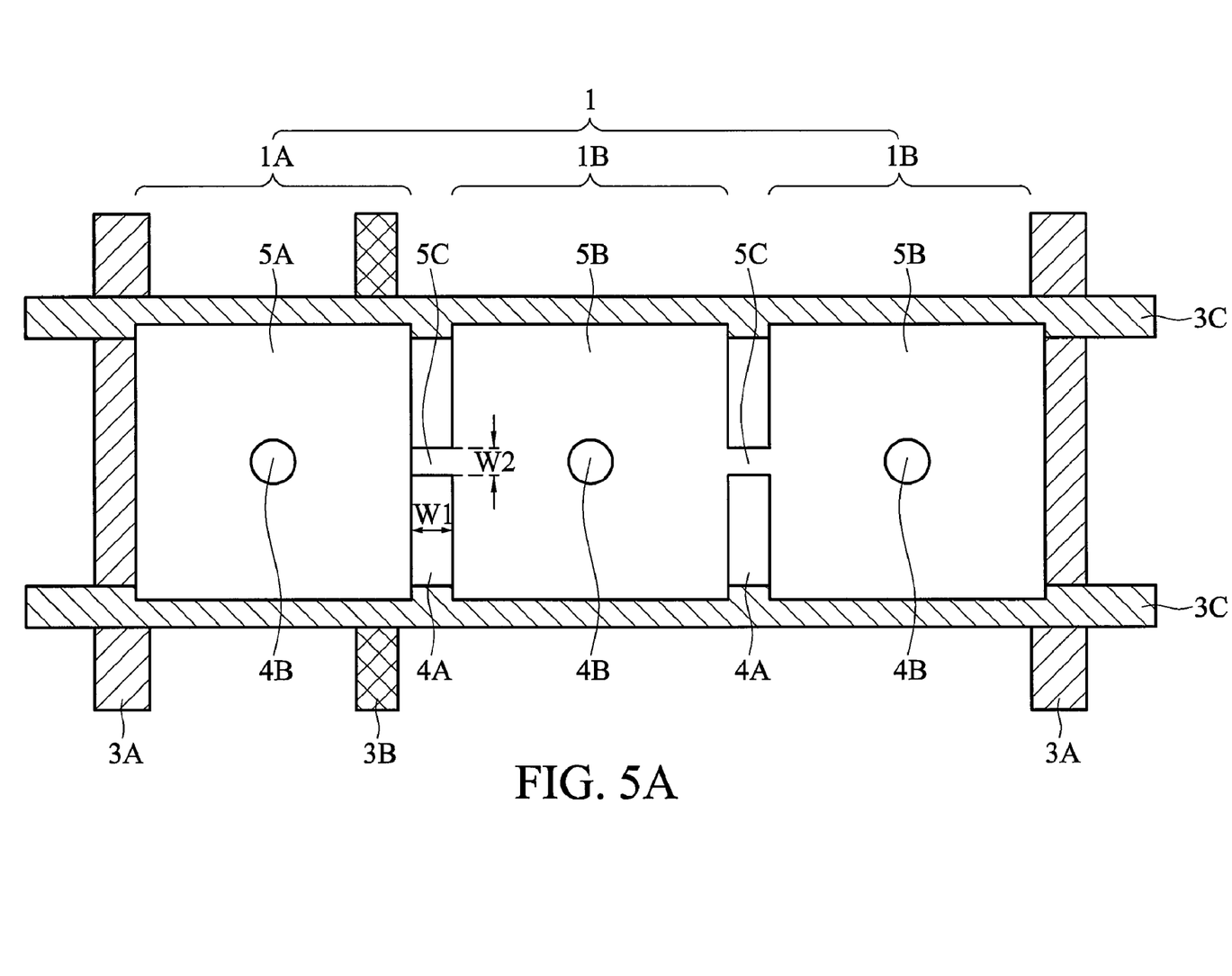
FIGS. 5A-5D are top views of array substrates in embodiments of the invention.
Figure 5B:
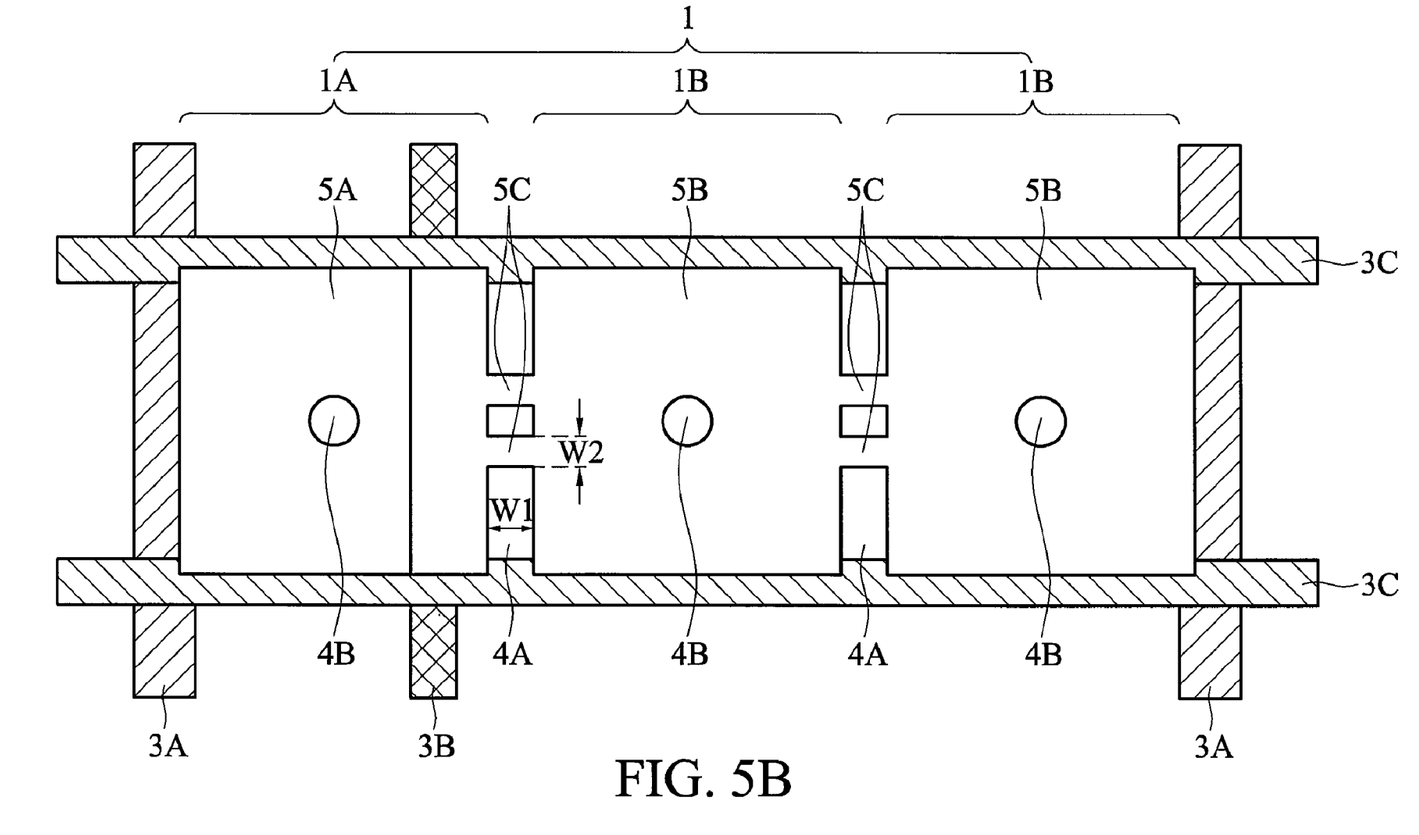

FIGS. 5A-5D are top views of the array substrate of embodiments of the invention. FIGS. 5A and 5B show transflective LCD panels, their common lines 3A perpendicularly crossing the data lines 3C to define subpixels 1, which are divided into reflection region 1A and transmission region 1B, having reflective electrode portion 5A and transparent electrode portion 5B, respectively. Separated reflective electrode portion 5A and transparent electrode portion 5B are electrically connected by at least one connection electrode 5C. The gate line 3B, electrically connecting to the transistor (not shown) which drives the subpixel 1, does not overlap the connection electrode 5C or the major slits 4A. Every alignment protrusion only influences a limited region. If the transmission region is too large, the transparent electrode portion 5B forms corresponding major slits 4A and more than two transmission regions 1B. The major slits 4A have a width W1 of about 1 µm to about 15 µm, and preferably of about 7 µm to about 10 µm. The connection electrodes 5C have a width W2 of about 1 µm to about 15 µm, and preferably of about 5 µm to about 6 µm.

Embodiment 7

The Array Substrate of the Transflective LCD Panel

In FIG. 5B, part of the transparent electrode portion 5B of the transmission region 1B extends to the reflection region 1A to shield gate line 3B. In this embodiment, there are preferably two connection electrodes 5C. The distance between these connection electrodes is preferably about 1 μm to about 15 μm, and more preferably about 6 μm. In order that the effect of major slits 4A or other devices is not degraded by higher density of the connection electrodes 5C, more connection electrodes are preferred. Not only this embodiment but also other embodiments may utilize a plurality of connection electrodes. The major slits 4A have a width W1 of about 1 μm to about 15 μm, and preferably of about 7 μm to about 10 μm. The connection electrodes 5C have a width W2 of about 1 μm to about 15 μm, and preferably of about 5 μm to about 6 μm.

Embodiment 8

The Array Substrate of the Transmissive LCD Panel

Figure 5C:
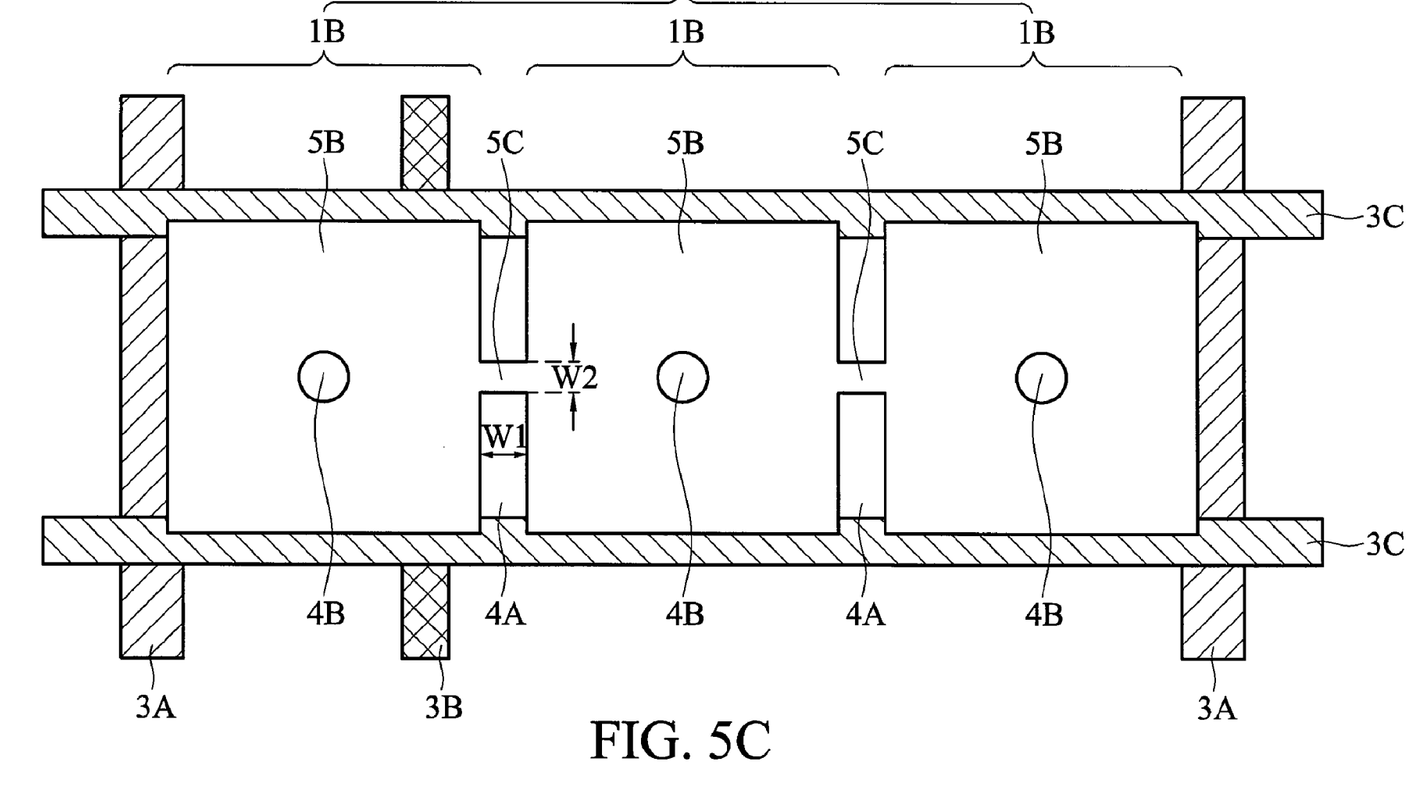

FIG. 5C is a top view of the array substrate of a transmissive LCD panel. According to the position of the alignment protrusions 4B, the transparent electrode portion 5B is divided into three (or more) transmission regions 1B by two (or more) major slits 4A. In this embodiment, the gate line 3B is shielded by the transparent electrode portion 5B. The major slits 4A have a width W1 of about 1 μm to about 15 μm, and preferably of about 7 μm to about 10 μm. The connection electrodes 5C have a width W2 of about 1 μm to about 15 μm, and preferably of about 5 μm to about 6 μm.

Embodiment 9

The Array Substrate of the Reflective LCD Panel

Figure 5D:
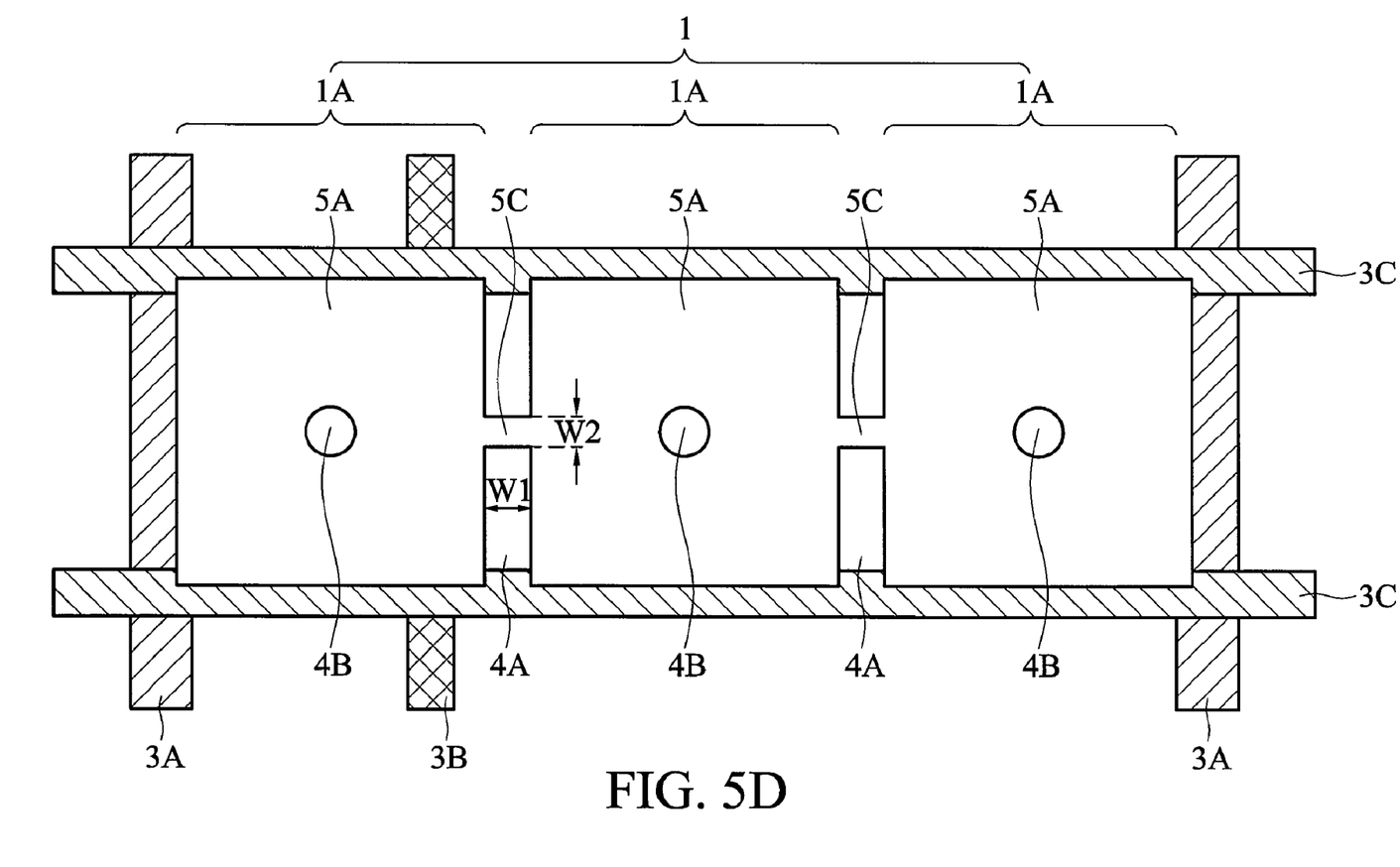

FIG. 5D is a top view of an array substrate of a reflective LCD panel. According to the position of the alignment protrusions 4B, the reflection electrode portion 5A is divided into three (or more) reflection regions 1A by two (or more) major slits 4A. In this embodiment, the gate line 3B does not overlap the major slits 4A and or the connection electrode 5C. The major slits 4A have a width W1 of about 1 μm to about 15 μm, and preferably of about 7 μm to about 10 μm. The connection electrodes 5C have a width W2 of about 1 μm to about 15 μm, and preferably of about 5 μm to about 6 μm. LCD panels as shown in FIGS. 5A-5D solve the problems of the liquid crystal molecule arrangement being influenced by the gate lines.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display panel, comprising: an array substrate, comprising: a plurality of gate lines disposed in parallel; and a plurality of data lines perpendicular to the gate lines, wherein the gate lines and the data lines define a plurality of subpixels; a plurality of TFTs, wherein one of the TFTs is electrically connecting to one of the gate lines; an electrode electrically connecting to the one of the TFTs, wherein the electrode includes: a first electrode portion; a second electrode portion; and a first connection electrode portion electrically connected the first electrode portion and the second electrode portion so that at least one major slit is formed between the first electrode portion and the second electrode portion, wherein the one of the gate lines is substantially not exposed by the at least one major slit; an opposite substrate disposed opposite to the array substrate; and a liquid crystal layer disposed between the array substrate and the opposite substrate, wherein the one of the gate lines is substantially shielded by the second electrode portion.

2. The liquid crystal display panel as claimed in claim 1, wherein the first electrode portion is reflective, and the second electrode portion is transparent.

3. The liquid crystal display panel as claimed in claim 2, further comprising a plurality of protrusions formed on the array substrate.

4. The liquid crystal display panel as claimed in claim 2, further comprising a plurality of protrusions formed on the opposite substrate.

5. The liquid crystal display panel as claimed in claim 4, further comprising a photoresist layer disposed between the protrusions and the opposite substrate.

6. The liquid crystal display panel as claimed in claim 2, wherein the one of the gate lines is substantially shielded by the first electrode portion.

7. The liquid crystal display panel as claimed in claim 2, wherein the major slit has a width of about 1 μm to about 15 μm.

8. The liquid crystal display panel as claimed in claim 2, wherein the major slit has a width of about 7 μm to about 10 μm.

9. The liquid crystal display panel as claimed in claim 2, wherein the first connection electrode portion has a width of about 1 μm to about 15 μm.

10. The liquid crystal display panel as claimed in claim 2, wherein the first connection electrode portion has a width of about 5 μm to about 6 μm.

11. The liquid crystal display panel as claimed in claim 2, wherein the electrode further includes a second connection electrode portion connected the first electrode portion and the second electrode portion, and spaced apart from the first connection electrode portion at about 1 μm to about 15 μm.

12. The liquid crystal display panel as claimed in claim 2, wherein the electrode further includes a third electrode portion electrically connected to the second electrode portion, wherein the third electrode portion is transparent.

13. The liquid crystal display panel as claimed in claim 2, wherein the first electrode portion has an area being about 0.4 to about 3 times that of that of the second electrode portion.

14. The liquid crystal display panel as claimed in claim 1, wherein the first electrode portion and the second electrode portion are transparent.

15. The liquid crystal display panel as claimed in claim 14, further comprising a plurality of protrusions formed on the opposite substrate.

16. The liquid crystal display panel as claimed in claim 14, wherein the major slit has a width of about 1 μm to about 15 μm.

17. The liquid crystal display panel as claimed in claim 14, wherein the first connection electrode portion has a width of about 1 μm to about 15 μm.

18. The liquid crystal display panel as claimed in claim 14, wherein the electrode further includes a third electrode portion electrically connected to the second electrode portion, wherein the third electrode portion is transparent.

19. The liquid crystal display panel as claimed in claim 1, wherein the first electrode portion and the second electrode portion are reflective.

20. The liquid crystal display panel as claimed in claim 19, further comprising a plurality of protrusions formed on the opposite substrate.

21. The liquid crystal display panel as claimed in claim 19, wherein the major slit has a width of about 1 μm to about 15 μm.

22. The liquid crystal display panel as claimed in claim 19, wherein the first connection electrode portion has a width of about 1 μm to about 15 μm.

23. The liquid crystal display panel as claimed in claim 19, wherein the electrode further includes a third electrode portion electrically connected to the second electrode portion, wherein the third electrode portion is reflective.

24. The liquid crystal display panel as claimed in claim 1, wherein the opposite substrate is a color filter substrate.

25. The liquid crystal display panel comprising: an array substrate, comprising: a plurality of gate lines disposed in parallel; and a plurality of data lines perpendicular to the gate lines, wherein the gate lines and the data lines define a plurality of subpixels; a plurality of TFTs, wherein one of the TFTs is electrically connecting to one of the gate lines; an electrode electrically connecting to the one of the TFTs, wherein the electrode includes: a first electrode portion; a second electrode portion; and a first connection electrode portion electrically connected the first electrode portion and the second electrode portion so that at least one major slit is formed between the first electrode portion and the second electrode portion, wherein the one of the gate lines is substantially not exposed by the at least one major slit; an opposite substrate disposed opposite to the array substrate; and a liquid crystal layer disposed between the array substrate and the opposite substrate, wherein the one of the TFTs is substantially shielded by the first electrode portion.

* * * * *